(12) United States Patent
Doi et al.

(10) Patent No.: US 7,653,672 B2
(45) Date of Patent: Jan. 26, 2010

(54) HEAP DUMP ACQUIRING METHOD

(75) Inventors: Koji Doi, Yokohama (JP); Hiroyasu Nishiyama, Kawasaki (JP); Motoki Obata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 163 days.

(21) Appl. No.: 11/442,280

(22) Filed: May 30, 2006

(65) Prior Publication Data

US 2007/0011216 A1     Jan. 11, 2007

(30) Foreign Application Priority Data

Jun. 20, 2005   (JP)   ............... 2005-178714

(51) Int. Cl.
*G06F 17/30* (2006.01)
(52) U.S. Cl. ............ 707/206; 711/133; 711/134; 711/135; 711/136
(58) Field of Classification Search ........... 707/206; 711/133–136
See application file for complete search history.

(56) References Cited

U.S. PATENT DOCUMENTS

2005/0114844 A1* 5/2005 Betancourt et al. .......... 717/128

FOREIGN PATENT DOCUMENTS

JP     11-312097     11/1999

* cited by examiner

*Primary Examiner*—Mohammad Ali
*Assistant Examiner*—Thuy (Tiffany) Bui
(74) *Attorney, Agent, or Firm*—Brundidge & Stanger, P.C.

(57) ABSTRACT

Under program execution environment, a file size of a heap dump is reduced which is acquired so as to detect memory leaks, and so as to investigate occurrence causes of the memory leaks. In order to provide a memory leak investigating means which can be used even in a large-scaled system, the below-mentioned heap dump acquiring method is provided: When a heap dump is acquired, only such an object within objects stored in a heap memory is outputted which is adapted to the following conditions: That is, in a condition (1), an object exists among objects which are newly produced within a designated time period, and in another condition (2), an object is present on a reference path defined from a root set to the object which satisfies the above-explained condition (1).

4 Claims, 4 Drawing Sheets

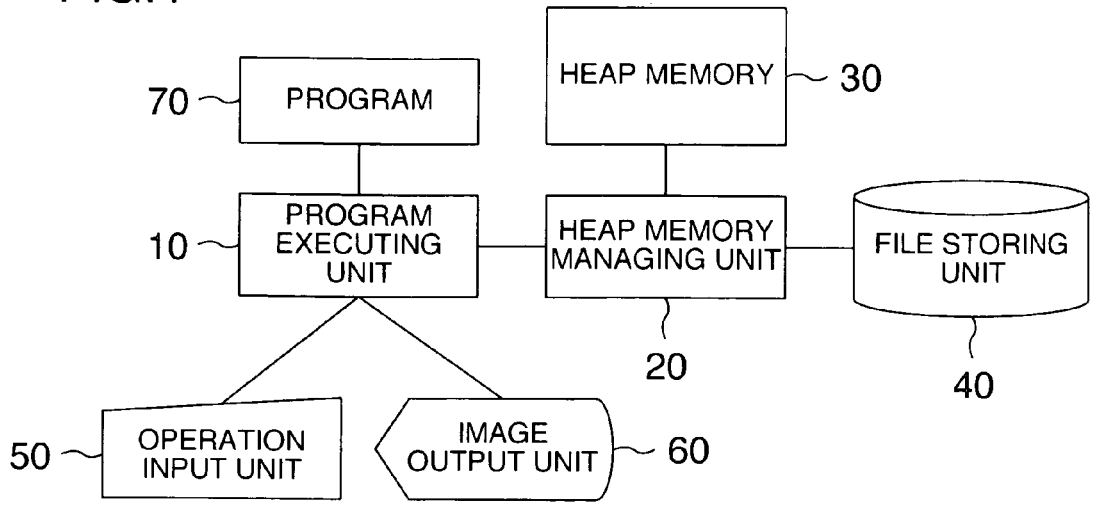
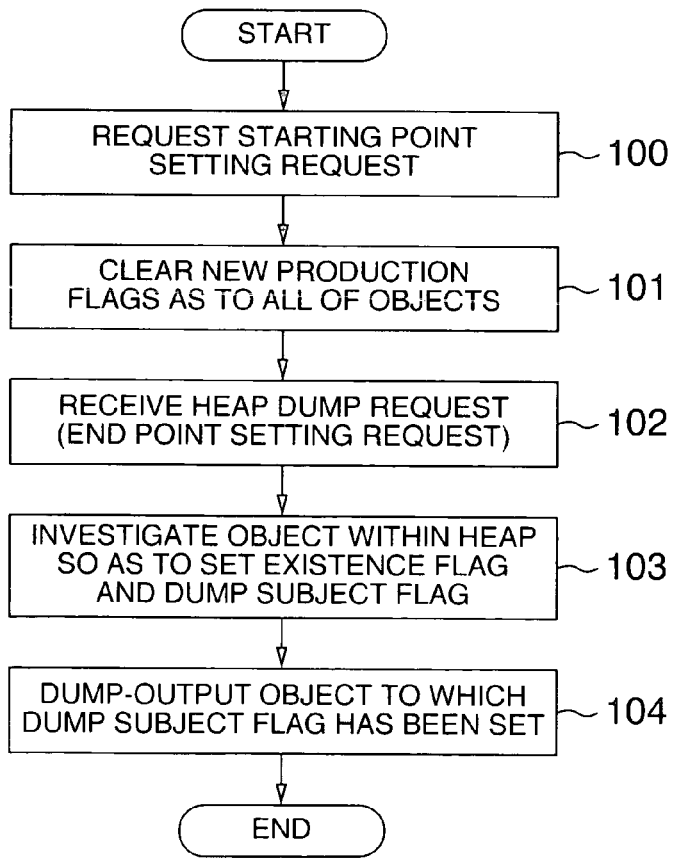

400 SCREEN DISPLAY EXAMPLE

HEAP DUMP ACQUIRING METHOD

INCORPORATION BY REFERENCE

The present application claims priority from Japanese application JP 2005-178714 filed on Jun. 20, 2005, the content of which is hereby incorporated by reference into this application.

BACKGROUND OF THE INVENTION

1. Field of the Invention

The present invention generally relates to a debug supporting method capable of preparing program execution environments with high reliability. More specifically, the present invention is directed to a method of acquiring a heap dump, which is advantageously used so as to detect/specify a memory leak.

2. Description of the Related Art

Normally, program execution environments are provided with memory managing mechanisms (heap memories) which dynamically allocate memory regions in response to requests issued from programs under execution. The programs store objects in the allocated memory regions so as to process these stored objects, and then, return the allocated memory regions at the time when necessities of holding the objects are lost (namely, release of objects).

An action in which a certain object has an ID of another object as data is called as "to refer", which is generally used as a programming method. In order to release an object, the below-mentioned two process operations are carried out. That is, in one process operation (1), referring to this object is canceled; and in another process operation (2), the memory region thereof is released. Depending upon program execution environment, a program may merely execute the process operation (1), whereas the other process operation (2) is automatically executed by the program execution environment. In general, this function is referred to as a "garbage collection."

Such a phenomenon is called as a "memory leak", where an object which is not required in order to execute a process operation of a program is not released to be left. When a memory leak happens to occur, a memory region which can be utilized by the program is decreased. Thus, there are some cases that the performance of this program is lowered and the process operation by the program cannot be executed. An occurrence of such a memory leak is caused by mis-programming. In order to solve a memory leak problem, the following object statuses must be specified, namely which object is not released to be left, and an object is not released because how the object refers.

Generally speaking, in order to specify such an object which constitutes an occurrence cause of a memory leak, the following sequential investigation is carried out: (1) It is to specify that a memory leak occurs when what operation is carried out (memory leak reproducing sequence). (2) A heap dump is acquired before and after the specified memory leak reproducing sequence is performed. (3) A difference is calculated between the two acquired heap dumps. As a result, since the memory leak reproducing sequence is carried out, such objects are specified which are newly produced and are not released to be left. These remaining objects may strongly constitute the occurrence cause of the memory leak.

After the objects which constitute the occurrence cause of the memory leak have been specified, a reference relationship among the objects is investigated based upon the acquired heap dumps, and thus, the reason why these objects are not released is specified.

The technical idea related to the above-explained object specifying operation is described in JP-A-11-312097.

SUMMARY OF THE INVENTION

The above-described conventional method owns the below-mentioned problems. That is, in the case that heap dumps are acquired while such a large-scaled system as a server program capable of executing business process operations of enterprise is employed as a subject, sizes of output files become huge which may give pressure to a capacity of a storage apparatus. Further, a lengthy time is necessarily required to perform dump output process operations. As a consequence, investigation cannot be completely carried out, or can be hardly performed.

In the conventional heap dump acquiring method, the size of the output file is substantially directly proportional to the use amount of the heap memory. In addition, in order to specify the objects which are newly produced within a certain time period, the heap dump must be acquired plural times.

To solve the above-explained problems, the present invention provide the below-mentioned heap dump acquiring method:

That is, when a heap dump is acquired, only such an object within objects stored in a heap memory is outputted which is adapted to the following conditions: That is, in a condition (1), an object exists among objects which are newly produced within a designated time period; and in another condition (2), an object is present on a reference path defined from a root set to the object which satisfies the above-explained condition (1).

In this specification, a "root set" is referred to as a basic object to which a program execution environment directly refers.

Since the above-described heap dump acquiring method of the present invention is carried out, the below-mentioned effects may be achieved:

That is, the objects which are newly produced in the designated time period can be specified by merely acquiring the heap dumps one time, and furthermore, the reason why these objects are not released can be investigated. Also, a total number of these objects which are dump-outputted can be reduced. In other words, the size of the output file can be largely reduced without deteriorating a valuable characteristic of the heap dumps. As a consequence, the use amount of the storage apparatus and the dump output processing time can be lowered.

BRIEF DESCRIPTION OF THE DRAWINGS

FIG. 1 is a block diagram for schematically representing an entire arrangement of a program execution environment according to an embodiment of the present invention.

FIG. 2 is a flow chart for describing operations in the case that a heap dump is acquired under the program execution environment.

DESCRIPTION OF THE EMBODIMENTS

Figure 3:
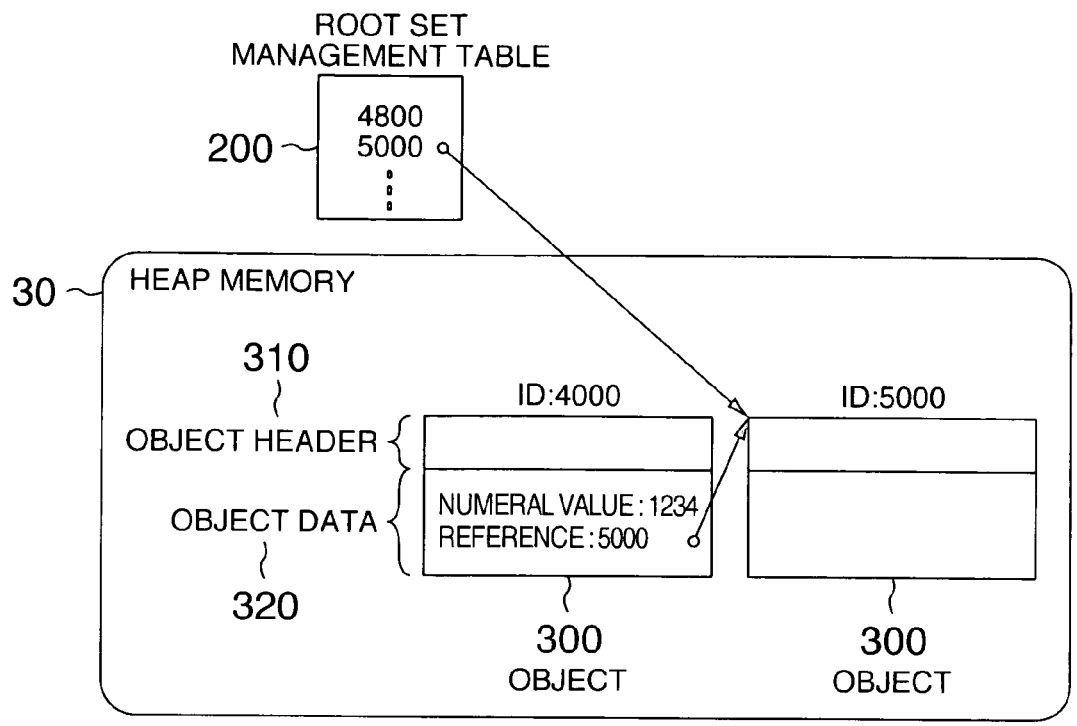
FIG. 3 is a structural diagram of a heap memory 30.

A heap dump acquiring method of the present invention is realized in the form of a heap dump acquiring function installed in a program execution environment. It is so assumed that this program execution environment is provided with a function (Garbage Collection function) capable of automatically releasing an object which cannot be reached from a root set.

EMBODIMENT 1

FIG. 1 is a block diagram for schematically representing an entire arrangement of a program execution environment according to an embodiment 1 of the present invention.

A program executing unit 10 executes a program 70. A heap memory managing unit 20 performs various sorts of process operations, namely, allocates and releases memory regions within a heap memory 30, and dump-outputs a memory content of the heap memory 30 to a file storage unit 40. The program executing unit 10 receives an operation input of a user from an operation input unit 50, and displays information on a screen display unit 60.

FIG. 2 is a flow chart for describing operations in the case that a heap dump is acquired under program execution environment.

FIG. 3 is a structural diagram of the heap memory 30. Objects 300 are stored in the heap memory 30. In this drawing, two pieces of the objects 300 (whose IDs are 4000 and 5000) are present. One object 300 is constituted by an object header 310 corresponding to management information, and object data 320 corresponding to a data main body. The object 300 whose ID is 4000 owns such a numeral value that a value is 1234 as the data, and a reference to the object whose ID is 5000. A root set management table 200 corresponds to such a table which manages a basic object 300 (root set) to which the program execution environment directly refers. In FIG. 3, the object 300 whose ID is 5000 constitutes the root set.

Figure 4:
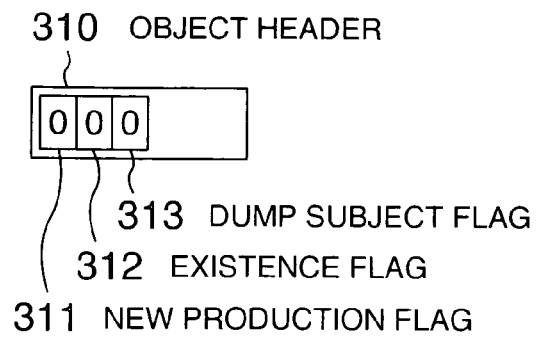
FIG. 4 is a diagram for showing a structure of an object header 310.

FIG. 4 is a diagram for indicating a structure of the object header 310. The object header 310 owns a new production flag 311, an existence flag 312, and a dump subject flag 313. Each of these flags 311, 312, 313 is 1 bit, and has either 0 or 1 as the value thereof. When the object 300 is newly produced, "1 (new production)" is set to the new production flag 311, whereas when a clearing process operation is carried out, "0 (not newly produced)" is set to the new production flag 311.

Next, operations of the respective units shown in FIG. 1 will now be explained based upon the flow chart of FIG. 2.

First, an execution of the program 70 is commenced under program execution environment. When the program executing unit 10 receives a starting point setting request which has been previously entered by a user (step 100), the program executing unit 10 interrupts the execution of the program 70, and then, calls a starting point setting function (step 101) of the heap memory managing unit 20.

Figure 5:
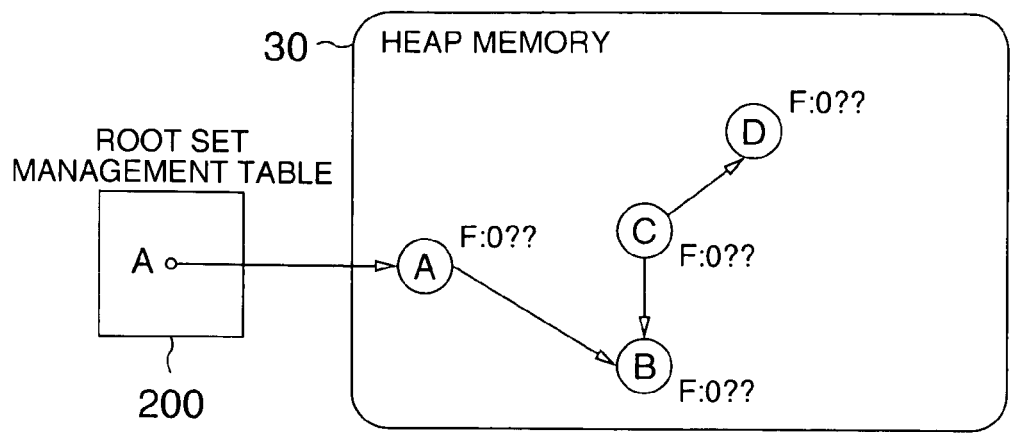
FIG. 5 simply indicates the structural diagram of the heap memory 30 of FIG. 3 in which objects 300 are indicated by symbols "A", "B" and the like, which are surrounded by circles.

In the step 101, the heap memory managing unit 20 clears the new production flag 311 (FIG. 4) of all of the objects 300 (FIG. 3) which have been stored in the heap memory 30. That is, the heap memory managing unit 20 sets "0": a value which indicates that the object 300 is not newly produced. An example as to a status of the heap memory 30 at this time is indicated in FIG. 5. FIG. 5 simply indicates the structural diagram of the heap memory 30 of FIG. 3 in which the objects 300 are indicated by symbols "A", "B", and the like, which are surrounded by circles.

In this drawing, FIG. 5 represents that 4 pieces of objects A, B, C, and D are present; the object "A" refers to the object "B"; and the object "C" refers to both the object "B" and the object "C." Also, symbol "A" becomes an object which is contained in the root set. Also, symbol "F:0??" located in the vicinity of each of the objects A to D indicates statuses of the 3 flags of the object header 310, and the respective digits of this symbol (F:0??) correspond to the new production flag 311, the existence flag 312, and the dump subject flag 313, respectively. In this case, since the new production flag 311 is cleared, the first digit is "0", and since other two flags 312 and 313 are not yet set, the second and third digits are "?" (uncertain: either 0 or 1). When the above-described flag setting process operation is accomplished, the program executing unit 10 restarts the execution of the program 70.

When the program executing unit 10 receives a heap dump request (end point setting request) which has been previously entered by the user (step 102, FIG. 2), the program executing unit 10 interrupts the execution of the program 70, and then, calls a heap dump function of the heap memory managing unit 20.

Figure 6:
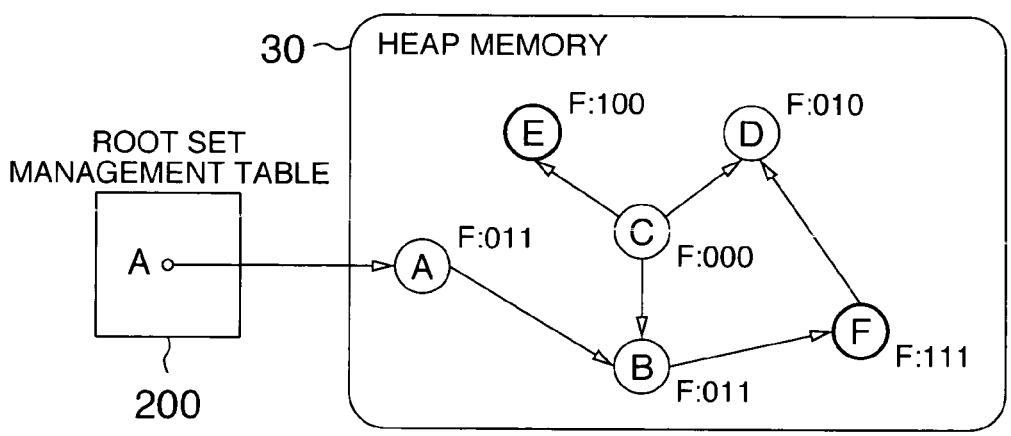
FIG. 6 is a diagram for illustratively showing an example of a status of the heap memory 30 at the time defined by a step 103 of FIG. 2.

In a step 103, the heap memory unit 20 (FIG. 1) investigates all of the objects 300 (FIG. 3) which have been stored in the heap memory 30, and sets both the existence flag 312 and the dump subject flag 313. The existence flag 312 is set to "1 (existence)" in the case that the object 300 can be reached by tracing a reference from the root set, whereas the existence flag 312 is set to "0 (non-existence)" in the case that the object 300 cannot be reached by tracing the reference from the root set. Also, the dump subject flag 313 is set to "1 (subject)" in such a case that any one of following conditions (1) and (2) is satisfied, whereas the dump subject flag 313 is set to "0 (non-subject)" in such a case that both of conditions (1) and (2) are not satisfied. That is, in the condition (1), both the new production flag 311 and the existence flag 312 are "1." In the condition (2), the object 300 is present on a chain from the root set to a reference to the object 300, which is adapted to the condition (1). FIG. 6 shows are status examples of the heap memory 30 at this time. An object which is adapted to any one of the above-explained two conditions (1) and (2) is to be dumped. For example, an object "F" is adapted to the condition (1), and both an object "A" and an object "B" are adapted to the condition (2), so that these objects "A", "B", "F" are to be dumped. Other objects "C", "D", and "E" are not adapted to any of these conditions (1) and (2), so that these objects "C", "D", "E" are not to be dumped.

Comparing with the memory status of FIG. 5, in the memory status of FIG. 6, two objects "E" and "F" are newly added; the object "C" refers to the object "E"; the object "B" refers to the object "F"; and the object "F" refers to the object "D." In this connection, values of flags of the respective objects "A" to "F" will now be explained. In the objects "E" and "F" which are newly added, the new production flags 311 thereof are "1." Since the objects "A", "B", "D" and "F" can be reached from the root set, "1" has been set to the existence flags 311 thereof (note that "0" has been set to objects "C" and "E" which cannot be reached from root set). As to the object "F", since both the new production flag 311 and the existence flag 312 are "1", "1" has been set to the dump subject flag 313. Since both the object "A" and the object "B" are present on a reference path originated from the root set to the object "F", "1" has been set to the dump subject flag 313. Since the object "C", the object "D", and the object "E" are not adapted to any of the above-described two conditions, "0" has been set to the dump subject flag 313.

The flag setting operation (step 103) which is required in the output of the heap dump has been accomplished by executing the above-described step. In a step 104, the heap memory managing unit 20 selects such an object whose dump subject flag 313 is equal to "1" from the objects 300 stored in the heap memory 30, and then, dump-outputs the selected object 300 to the file storage unit 40. In the case that the object 300 which is dump-outputted is such an object contained in the root set, or the new production flag 311 has been set, the heap memory managing unit 20 also outputs information indicative of these facts. A series of the heap dump output process operations may be accomplished by executing the above-described process steps.

Figure 7:
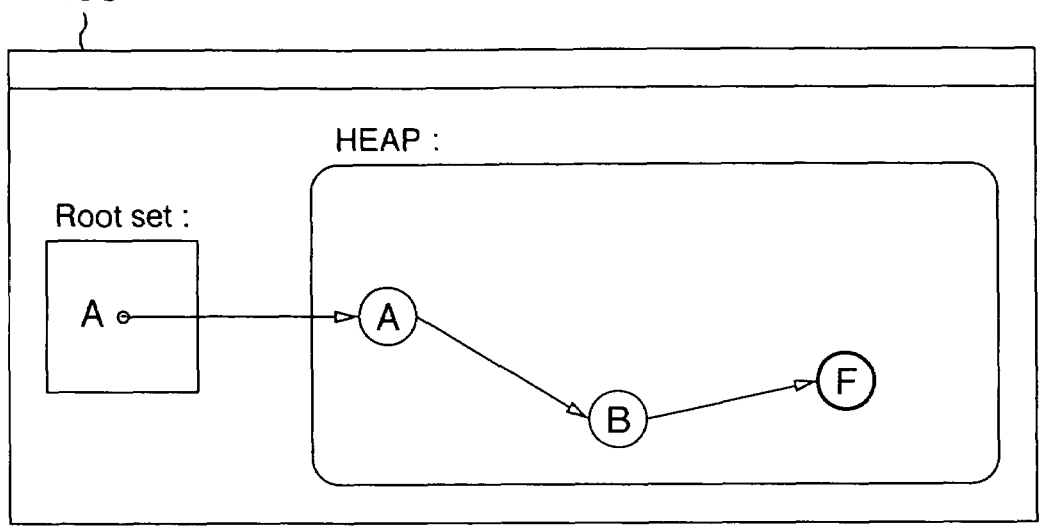
FIG. 7 illustratively indicates a screen example of application software which is used when a file outputted by a heap dump acquiring function of this embodiment is analyzed.

FIG. 7 illustratively shows a screen example of an application program which is employed when a file outputted by the heap dump acquiring function of this embodiment 1 is analyzed. As a consequence, the user can immediately acquire such important information in the investigation of the memory leaks. That is, as the important information, the object "F" corresponds to such an object which is newly formed and exists during a designated time period (namely, there is strong questionable point that this object constitutes cause of memory leaks); and also, the reason why the object "F" is not released by the program execution environment is given as follows: That is, there is a reference made from the root set via the objects "A" and "B" to the object "F." It should be understood that in the above-explained embodiment, the starting point and the end point of the time period for calculating a difference of the heap dumps have been determined by being previously inputted by the user. Alternatively, other conditions may be employed as triggers. That is, various conditions related to execution statuses of a program may be utilized as the triggers, for instance, a commencement and an end of the program; before/after an execution of a specific code; and such a case that a heap memory use amount is reached to a threshold value.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. Under a program execution environment equipped with a function capable of automatically releasing an object which is not present on a chain of a reference from a root set, a heap dump acquiring method comprising:
   a first step in which an object having a new production flag, an existence flag, and a dump subject flag is stored in a heap memory;
   a second step for receiving a starting point setting request;
   a third step for clearing new production flags of all of the objects stored in the heap memory;
   a fourth step for receiving an end point setting request after a previously designated time period has passed, a newly produced flag for an object having been added being assigned a value "1" showing a new production before the end point setting request is received;
   a fifth step for setting both existence flags according to reference relationships among the objects and dump subject flags according to reference relationships among the existence flag, the new production flag and the objects of all of the objects stored in the heap memory;
   a sixth step for performing a dump output based upon the dump subject flags set in said fifth step; and
   a seventh step for displaying only such an object present on the chain of the reference from the root set within the objects which exist based upon said existence flags in said sixth step,
   wherein said dump subject flag implies as being a subject flag in the case that any one of conditions (1) and (2) is satisfied, namely, the condition (1) under which said new production flag of the object implies "a new production" and also implies that said existence flag implies "existence"; and the condition (2) under which the object is present on the chain of the reference to the object which is related to said condition (1) from the root set, whereas said dump subject flag implies as not being a subject flag in the case that both of said conditions (1) and (2) are not satisfied.

2. A heap dump acquiring method as claimed in claim 1, wherein a function for automatically releasing an object which is not present on the chain of the reference from said root set corresponds to a garbage collection function.

3. A heap dump acquiring method as claimed in claim 1, wherein said existence flag is set by such an implication of "existence" when the object is present on the chain of the reference from the root set, or by such an implication of "invalid" when the object is not present on the chain of the reference from the root set.

4. In a heap dump acquiring method provided with a function capable of automatically releasing an object which is not present on a chain of a reference from a root set, said heap dump acquiring method comprising:
   a first step for storing an object having a new production flag, an existence flag, and a dump subject flag in a heap memory;
   a second step for receiving a starting point setting request which sets a starting point of a dump subject portion of the object stored in said heap memory;
   third step for clearing said new production flags as to all of the objects stored in the heap memory;
   a fourth step for receiving an end point setting request which sets an end point of said dump subject portion during a previously designated time period after said starting point setting request, a newly produced flag for an object having been added being assigned a value "1" showing a new production before the end point setting request is received
   a fifth step for setting both existence flags according to reference relationships among the objects and dump subject flags according to reference relationships among the existence flag, the new production flag and the objects as to all of the objects stored in the heap memory based upon said starting point and said end point;
   a sixth step for performing a dump output based upon the dump subject flags set in said fifth step; and
   a seventh step for displaying only such an object present on the chain of the reference from the root set within the objects which exist based upon said existence flags in said sixth step,
   wherein said dump subject flag implies as being a subject flag in the case that any one of conditions (1) and (2) is satisfied, namely, the condition (1) under which said new production flag of the object implies "a new production" and also implies that said existence flag implies "existence" ; and the condition (2) under which the object is present on the chain of the reference to the object which is related to said condition (1) from the root set, whereas said dump subject flag implies as not being a subject flag in the case that both of said conditions (1) and (2) are not satisfied.

* * * * *